United States Patent
Hatano

(10) Patent No.: US 8,645,705 B2
(45) Date of Patent: Feb. 4, 2014

(54) INFORMATION PROCESSING DEVICE AND ACTIVATION CONTROL METHOD

(75) Inventor: Ken Hatano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1161 days.

(21) Appl. No.: 12/124,075

(22) Filed: May 20, 2008

(65) Prior Publication Data

US 2008/0301423 A1 Dec. 4, 2008

(30) Foreign Application Priority Data

May 29, 2007 (JP) ................. 2007-142202

(51) Int. Cl.
*H04L 29/06* (2006.01)

(52) U.S. Cl.
USPC ........... 713/182; 713/162; 713/300; 380/252; 380/255

(58) Field of Classification Search
USPC ................................ 713/300, 182
See application file for complete search history.

(56) References Cited

U.S. PATENT DOCUMENTS

| 6,105,140 | A * | 8/2000 | Crisan ........................ 713/310 |
| 6,427,182 | B1 | 7/2002 | Sugiura et al. |
| 6,526,507 | B1 * | 2/2003 | Cromer et al. ............... 713/162 |
| 6,606,709 | B1 * | 8/2003 | Connery et al. .............. 726/14 |
| 7,275,257 | B1 | 9/2007 | Kim et al. |
| 2005/0160196 | A1 * | 7/2005 | Dutton et al. ................. 710/10 |
| 2005/0166213 | A1 * | 7/2005 | Cromer et al. ............... 719/315 |
| 2006/0206700 | A1 | 9/2006 | Umedu |
| 2007/0049991 | A1 * | 3/2007 | Klostermann et al. ......... 607/60 |
| 2007/0205872 | A1 * | 9/2007 | Kim et al. ................. 340/10.33 |
| 2008/0092248 | A1 * | 4/2008 | He et al. ....................... 726/36 |

FOREIGN PATENT DOCUMENTS

| JP | 8-63252 | 3/1996 |
| JP | 11-345205 | 12/1999 |
| JP | 11-353266 | 12/1999 |
| JP | 2000-322363 | 11/2000 |
| JP | 2003-84981 | 3/2003 |
| JP | 2003-150268 | 5/2003 |

OTHER PUBLICATIONS

Abarca et al., "Wake on LAN over Internet as Web Service", 2006, IEEE, pp. 1261-1268.*
Japanese Patent Application No. 2007-142202, Notice of Reasons for Rejection, mailed Dec. 13, 2011, (with English Translation).

* cited by examiner

*Primary Examiner* — Taghi Arani
*Assistant Examiner* — Thaddeus Plecha
(74) *Attorney, Agent, or Firm* — Blakely, Sokoloff, Taylor & Zafman LLP

(57) ABSTRACT

According to one embodiment, an information processing device includes a receiving section configured to receive a trigger signal from a device connected thereto, a verifying section configured to verify the trigger signal when the receiving section receives the trigger signal, and an activating section configured to activate the system when the verification of the trigger signal is successfully made by the verifying section.

12 Claims, 4 Drawing Sheets

INFORMATION PROCESSING DEVICE AND ACTIVATION CONTROL METHOD

CROSS-REFERENCE TO RELATED APPLICATIONS

This application is based upon and claims the benefit of priority from Japanese Patent Application No. 2007-142202, filed May 29, 2007, the entire contents of which are incorporated herein by reference.

BACKGROUND

1. Field

One embodiment of the present invention relates to an information processing device such as a personal computer, and particularly to an information processing device the system of which can be safely activated by an external device, and also to an activation control method adopted in such a device.

2. Description of the Related Art

In a personal computer in general, when its chipset is not started, a wakeup event cannot be issued from a device that utilizes a USB Wakeup function or the like. For this reason, Jpn. Pat. Appln. KOKAI Publication No. 8-63252 discloses a technology of delivering a wakeup event from the device to a power management module (hereinafter, referred to as "PMM") by bypassing the chipset, with a sideband signal line through which only a pull-up signal can be sent between the device and the PMM.

With this technology, the system may be started up even when the chipset is not activated. However, because of the simple structure of the wakeup signal, the system may be illegally started with a faked signal, creating a security problem.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing device includes a receiving section configured to receive the trigger signal from the connected device, and a verifying section configured to verify the trigger signal when the receiving section receives the trigger signal. When verification of the trigger signal is successfully made by the verifying section, the system is activated.

The present invention also offers an activation control method for activating a system with a trigger signal issued by a device connected thereto. The method comprises a receiving step in which the trigger signal is received from the connected device, and a verifying step in which the trigger signal is verified when the trigger signal is received in the receiving step. When verification of the trigger signal is successfully made in the verifying step, the system is activated.

According to the present invention, security of the system can be improved by verifying a wakeup event before the activation of the system.

Embodiments of the present invention will be explained below with reference to the attached drawings.

The structure of an information processing device according to an embodiment of the present invention will be first discussed with reference to FIGS. 1 and 2. The information processing device is realized here in the form of a notebook personal computer 10.

Figure 1:
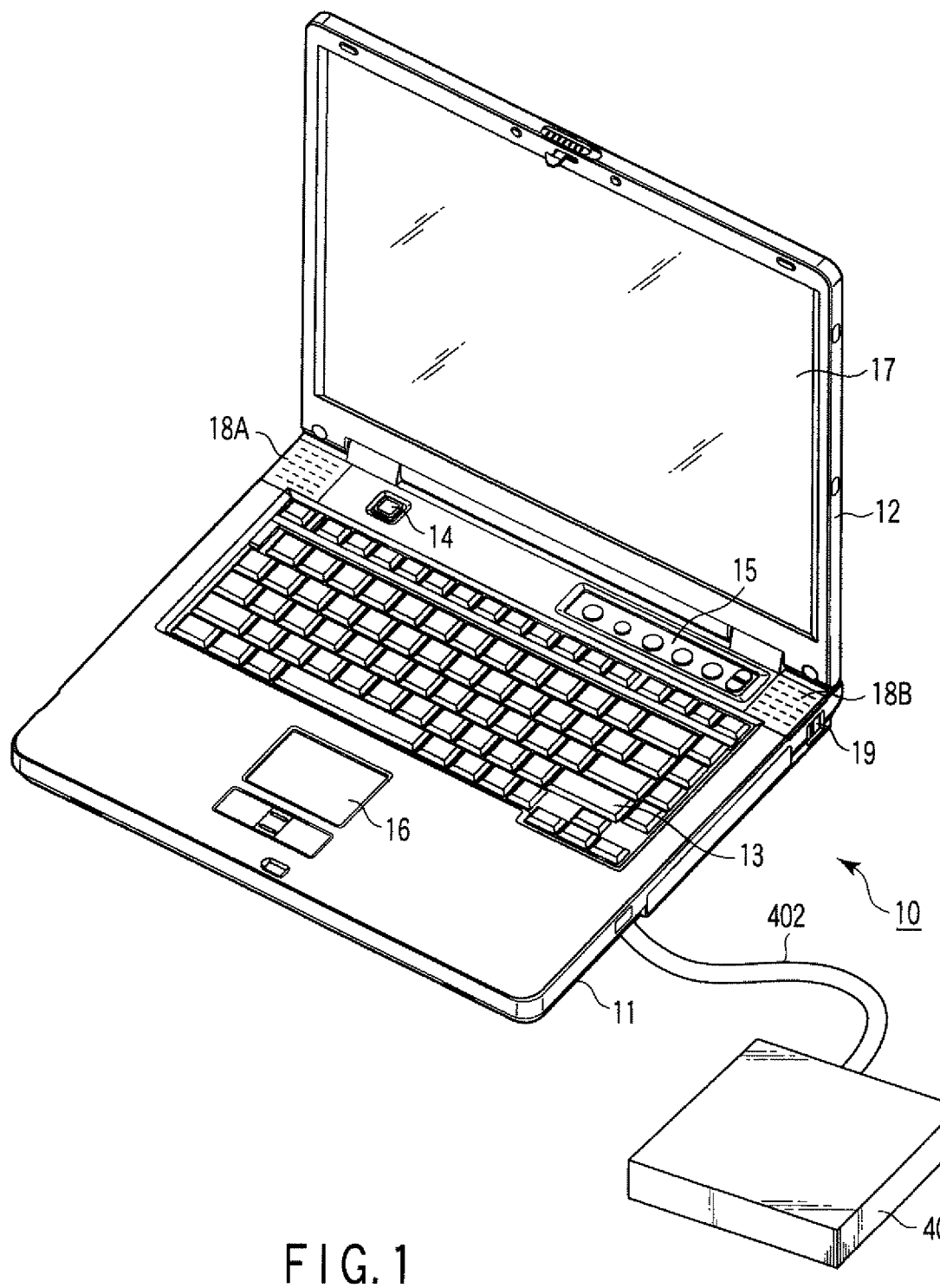
FIG. 1 is an exemplary perspective overview of a computer according to an embodiment of the present invention.

FIG. 1 shows a perspective view of the notebook personal computer 10 with its display unit open. The computer 10 comprises a computer main unit 11 and a display unit 12. A display device formed of a thin film transistor liquid crystal display (TFT-LCD) 17 is incorporated in the display unit 12, and the display screen of the LCD 17 is positioned substantially in the center of the display unit 12.

The display unit 12 is arranged on the computer main unit 11 rotatably between an open position and a close position. The computer main body 11 is a thin box housing, on top of which a keyboard 13, a power switch 14 for turning on/off the computer 10, an input operation panel 15, a touch pad 16, and a pair of speakers 18A and 18B.

The input operation panel 15 is an input device for inputting an event in correspondence with a pressed button, and has different buttons to activate different functions.

In addition, a device 400 is connected to the computer 10 by way of a USB cable 402, which is connected to a later-described USB host controller 403. This device 400 conforms to the USB standards.

Next, the structure of the system of the computer 10 will be explained with reference to FIG. 2.

Figure 2:
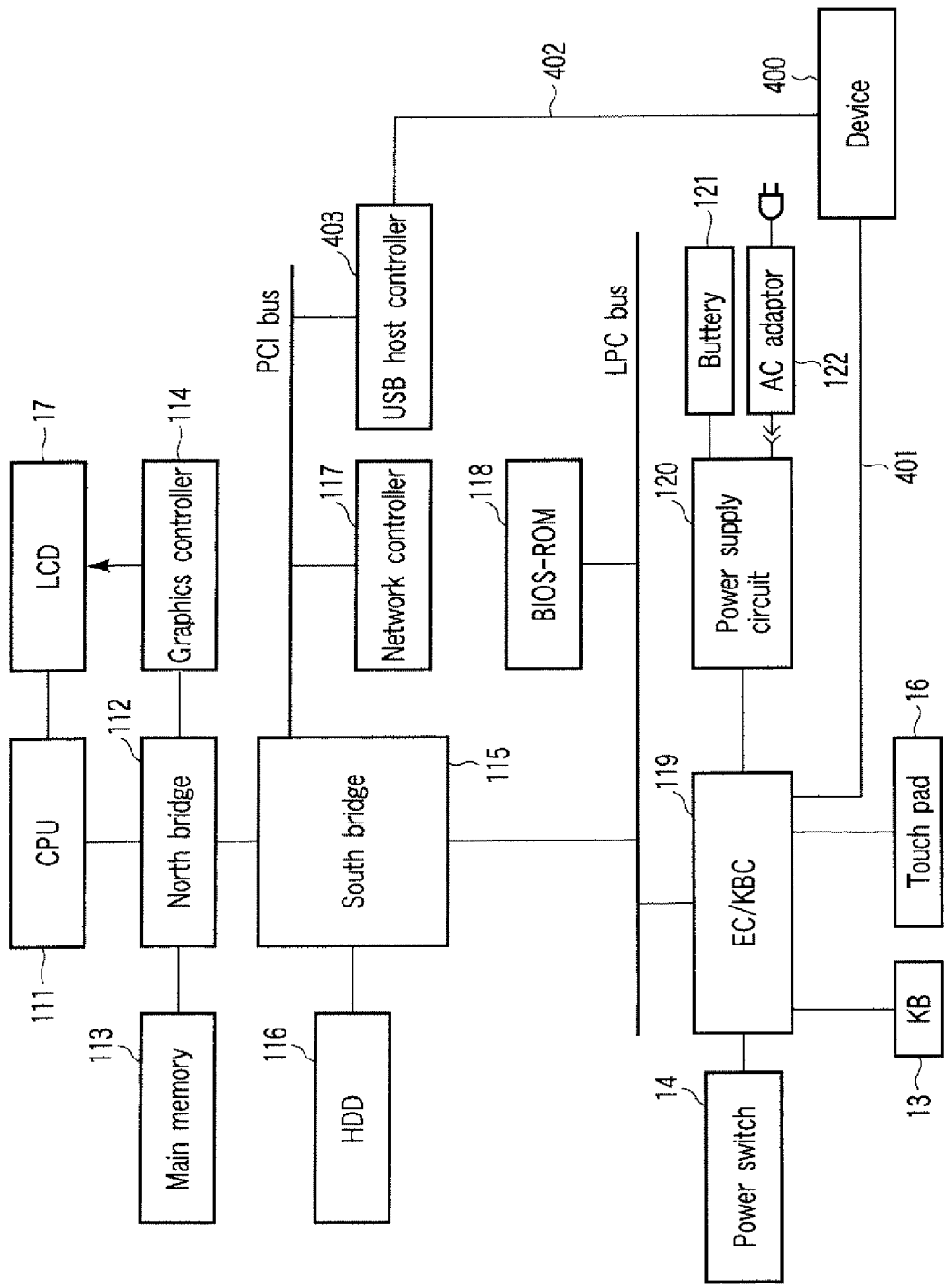
FIG. 2 is an exemplary block diagram of the system of the computer according to the embodiment of the present invention.

As illustrated in FIG. 2, the computer 10 comprises a CPU 111, a north bridge 112, a main memory 113, a south bridge 115, a graphics controller 114, BIOS-ROM 118 a network controller 117, a hard disk drive (HDD) 116, an embedded controller/keyboard controller (EC/KBC) 119, a power supply circuit 120, and the like.

The CPU 111 is a processor that controls the operation of the computer 10 and executes the operating system and various applications loaded from the HDD 116 into the main memory 113. The CPU 111 also executes the Basic Input/Output System (BIOS) stored in the BIOS-ROM 118. The BIOS is a hardware controlling program.

The north bridge 112 is a bridge device bridging the local bus of the CPU 111 and the south bridge 115. The north bridge 112 includes a memory controller that controls the access to the main memory 113. The north bridge 112 also conducts communications with the graphics controller 114 by way of a PCI Express serial bus or the like.

The graphics controller 114 is a display controller that controls the LCD 17 employed as a display monitor of the computer 10. A display signal generated by the graphics controller 114 is sent to the LCD 17.

The south bridge 115 controls devices on the low pin count (LPC) bus and on the peripheral component interconnect (PCI) bus. The south bridge 115 includes an integrated drive electronics (IDE) controller to control the HDD 116.

The embedded controller/keyboard controller (EC/KBC) 119 is a one-chip microcomputer in which an embedded controller for managing power supply and a keyboard controller for controlling the keyboard (KB) 13 and the touch pad 16 are integrated. The EC/KBC 119 turns the computer 10 on/off in accordance with the user's operation of the power switch 14.

The device 400 is connected to the computer 10 by way of the USB cable 402 via the USB host controller 403 that is connected on the PCI bus. The device 400 is also connected to a sideband 401, which is a line specially designed to transmit a pull-up signal (trigger signal) to the EC/KBC 119.

Figure 3:
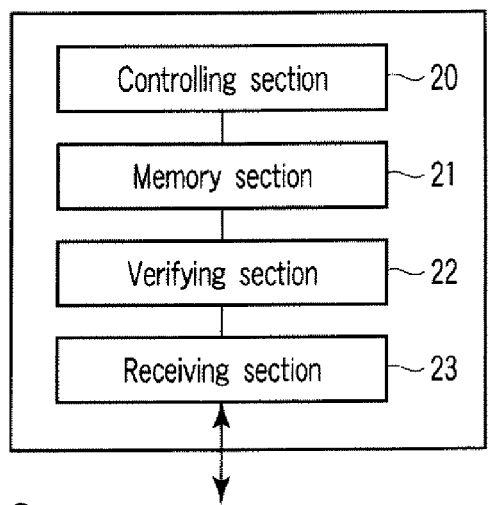
FIG. 3 is an exemplary block diagram of the functional structure of the computer according to the embodiment of the present invention.

Next, FIG. 3 is a block diagram of the functional structure of the information processing device according to the embodiment of the present invention.

A controlling section 20, a memory section 21, a verifying section 22, and a receiving section 23 are included as functional sections in the embodiment of the information processing device according to the present invention. The controlling section 20 is the CPU 111, which controls the entire system. The memory section 21 is a flash memory that stores verification information and encryption information (such as encryption keys). The information may be stored in the BIOS-ROM 118. The verifying section 22 is the BIOS-ROM 118, which verifies the trigger signals and devices. The receiving section 23 is the EC/KBC 119 and the USB host controller 403 that exchange signals with the device 400.

An activation control method to which the information processing device according to the embodiment of the present invention is applied will now be explained with reference to the flowchart of FIG. 4.

The EC/KBC 119 monitors reception of a pull-up signal, which is a trigger signal from the device 400 (block S101). When a pull-up signal that is a trigger signal is received from the device 400 (Yes in block S101), the EC/KBC 119 starts preparing the activation of the system (personal computer 10) (block S102). In accordance with the preparation of the system activation by the EC/KBC 119, the chipset is activated (block S103). Thereafter, the BIOS is activated (block S104).

The BIOS (verifying section) checks with the device 400 by way of the chipset to determine whether the pull-up signal that is a trigger signal has been transmitted (signal verification) (block S105). When the BIOS confirms with the device 400 in block S105 that the pull-up signal that is a trigger signal has been transmitted (signal verification successfully made, Yes in block S105), the system is activated (block S106). On the other hand, when the BIOS cannot confirm with the device 400 that the pull-up signal that is a trigger signal has been transmitted (failure of signal verification, No in block S105), the signal is considered as being illegally fabricated. Thus, the system is shut down (block S107). Instead of shutting down, the system may be put into a sleep mode, a suspend mode, or a lock mode. Furthermore, when exchanging signals during the verification, the signals may be encrypted.

A pull-up signal received from a USB-connected device is verified as discussed above, and thus the system can be prevented from being activated by an illegal pull-up signal, and security can be improved.

Next, a modification example will be explained with reference to the flowchart of FIG. 5.

Figure 4:
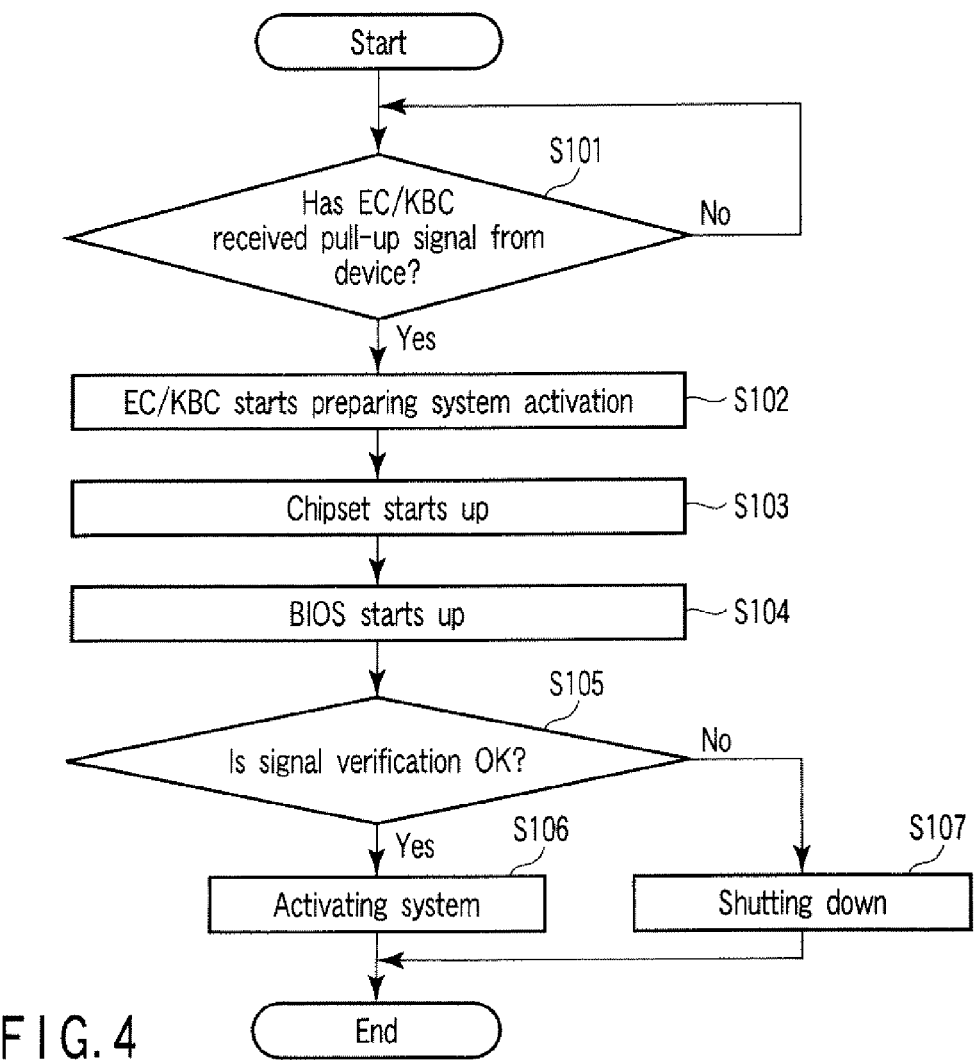
FIG. 4 is an exemplary flowchart of an activation control method for a computer according to an embodiment of the present invention.
Figure 5:
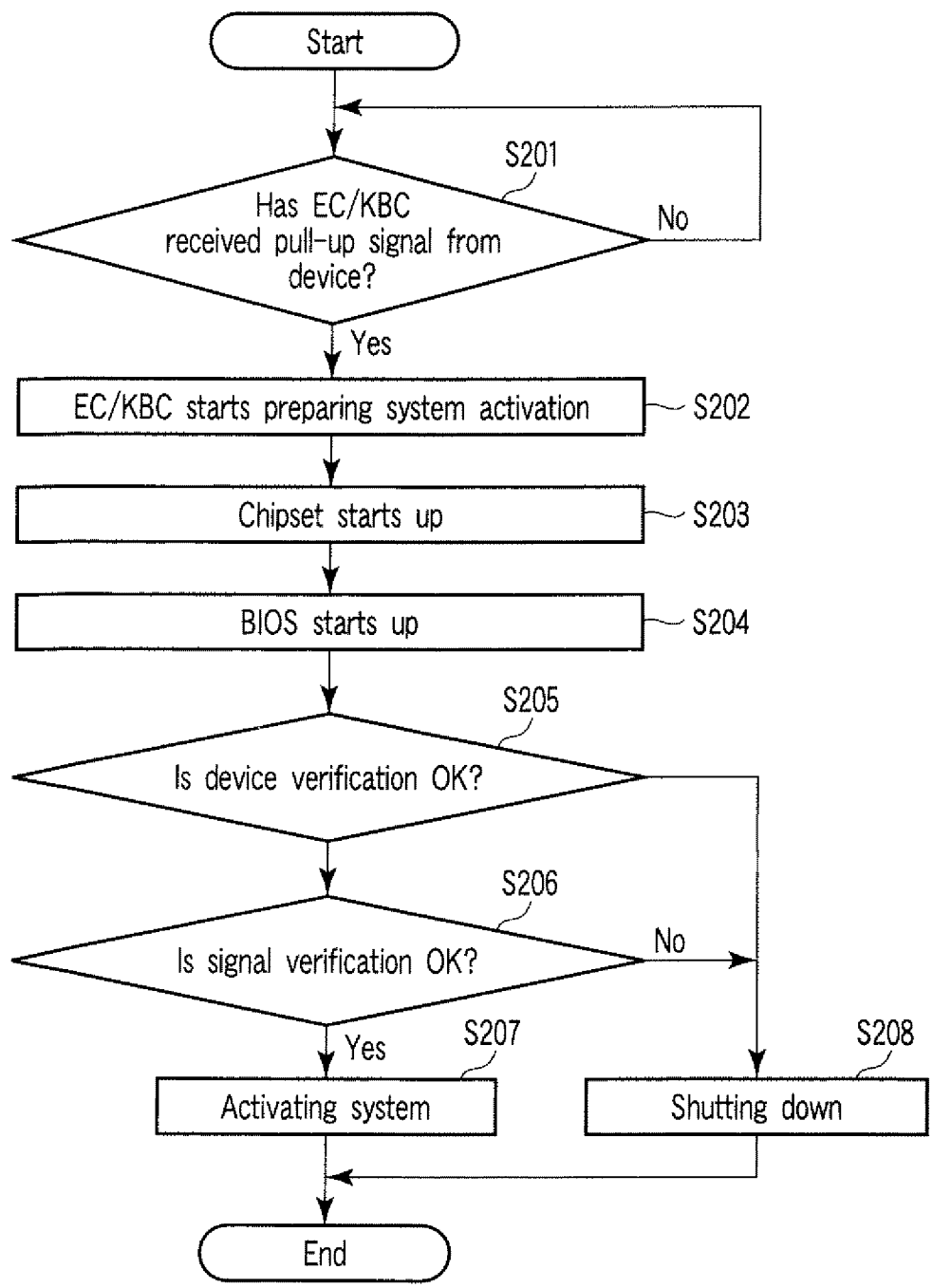
FIG. 5 is an exemplary flowchart of a modified example of the activation control method for a computer according to an embodiment of the present invention.

Block S S201 through S205 in FIG. 5 are the same as block S S101 through S105 in FIG. 4. In block S205, device verification is conducted for the device 400. When the verification is successfully made (Yes in block S205), the BIOS checks with the device 400 to determine whether the pull-up signal that is a trigger signal has been transmitted (signal verification) (block S206). When the signal verification is successfully made (Yes in block S206), the system is activated (block S207). On the other hand, when the device verification made for the device 400 by the BIOS is not successful in block S205 (No in block S205), the device is considered illegal, and the system is shut down (block S208). Further, when the signal verification made by the BIOS is not successful in block S206 (No in block S206), the device is considered illegal, and the system is shut down (block S208). Instead of shutting down, the system may be put into a sleep mode, a suspend mode, or a lock mode. Furthermore, when exchanging signals during the signal verification, the signals may be encrypted. When exchanging signals during the device verification for the device 400, the signals may also be encrypted.

With the above modification example, security can be further improved than with the technology according to the aforementioned embodiment.

The present invention is not limited to the above embodiment and modification example, but can be realized, when it is implemented, by modifying the structural components within the scope of the invention. In addition, various combinations of the structural components disclosed above can provide various inventions. For instance, some of the structural components may be omitted from the embodiment or the modification example, or the structural components in the embodiment and the modification example may be suitably combined.

The present invention has been conceived in light of the above problem. The purpose of the invention is to offer an information processing device and an activation controlling method that both can verify a wakeup signal before activating the system.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing device whose system is activated by a trigger signal issued by a device connected to the information processing device by a USB cable, the information processing device comprising:

a receiving section that receives the trigger signal from the connected device;

a verifying section that verifies the connected device after the receiving section receives the trigger signal and a chipset starts UP, and then verifies the trigger signal after the connected device is successfully verified, wherein the verifying section performs the verification of the trigger signal by checking with the connected device to determine whether the trigger signal has been transmitted after the chipset starts up;

an activating section that activates the system when the verification of the connected device and the trigger signal is successfully made by the verifying section; and a shutdown section that shuts down the system when the verification of the connected device or the trigger signal is not successfully made by the verifying section.

2. The information processing device according to claim 1, wherein the trigger signal is encrypted.

3. The information processing device according to claim 1, wherein a signal used in the verification of the connected device is encrypted.

4. The information processing device according to claim 1, wherein the verifying section is a Basic Input Output System (BIOS).

5. An activation control method of an information processing device for activating a system by a trigger signal issued from a device connected to the information processing device by a USB cable, the activation control method comprising:
   receiving the trigger signal from the connected device;
   starting a chipset;
   verifying the connected device after the trigger signal is received and the chipset is started;
   verifying the trigger signal after the connected device is verified, verifying the trigger signal including checking with the connected device to determine whether the trigger signal has been transmitted when the trigger signal is received;
   activating the system if both the connected device and the trigger signal are verified; and
   shutting down the system if either the connected device or the trigger signal are not verified.

6. The activation control method according to claim 5, wherein the trigger signal is encrypted.

7. The activation control method according claim 5, wherein a signal used in the verification of the connected device is encrypted.

8. The activation control method according to claim 5, wherein the verification of the trigger signal is conducted by a Basic Input Output System (BIOS).

9. An activation control method of an information processing device for activating a system by a trigger signal issued from a device connected to the information processing device by a USB cable, the activation control method comprising:
   receiving the trigger signal from the device;
   starting a chipset;
   verifying the connected device after the trigger signal is received and the chipset is started;
   verifying the trigger signal after the connected device is verified, the verifying of the trigger signal is performed by checking with the connected device to determine whether the trigger signal has been transmitted after start-up of a chipset implemented within the system;
   activating the system after the connected device and the trigger signal have both been verified; and
   placing the system into a non-operational state if either the connected device or the trigger signal cannot be verified.

10. The activation control method according to claim 9, wherein the non-operational state is a Sleep state.

11. The activation control method according to claim 9, wherein the non-operational state is a Suspend state.

12. The activation control method according to claim 9, wherein the verifying of the trigger signal is performed by a Basic Input Output System (BIOS) executed by a processor implemented within the system.

* * * * *